United States Patent [19]

Boze et al.

[11] 4,330,401

[45] May 18, 1982

[54] DYNAMIC CLARIFIER SYSTEM

[75] Inventors: Ronald A. Boze, Covington; Anthony S. Canzoneri, Kenner, both of La.

[73] Assignee: Process Development Company, Kenner, La.

[21] Appl. No.: 188,042

[22] Filed: Sep. 17, 1980

[51] Int. Cl.³ .................... B01D 23/10; B01D 23/24
[52] U.S. Cl. .................... 210/106; 210/189; 210/198.1; 210/268; 210/274
[58] Field of Search ............ 210/676, 792–796, 210/97, 106, 109, 189, 198.1, 268, 269, 274, 279, 287, 289, 291, 409–412

[56] References Cited

U.S. PATENT DOCUMENTS

| | | | |
|---|---|---|---|
| 3,537,582 | 11/1970 | Demeter | 210/268 |
| 3,667,604 | 6/1972 | Lagoutte | 210/268 |
| 4,126,546 | 11/1978 | Hjelmner et al. | 210/793 |
| 4,246,102 | 1/1981 | Hjelmner et al. | 210/793 |

Primary Examiner—Ivars C. Cintins
Attorney, Agent, or Firm—Keaty & Keaty

[57] ABSTRACT

A continuous clarification apparatus provides a vessel having a bottom portion and a preferably cylindrical and upwardly extending sidewall defining therewithin a liquid retaining space at least partially filled with a "floc" carrier forming a moving media bed with flow normally being downwardly through the bed. A clear water discharge outlet allows the discharge of clarified effluent from the vessel. An inlet header allows the addition of an influent to be clarified into the vessel. A vertically extending inner separation wall generally concentric with the vessel sidewall defines a moving bed area and an annulus area. The annulus area provides a lower scour zone, a middle return zone and an uppermost reject zone. The floc carrier is placed within the moving bed area and an aeration means is placed within the vessel annulus with the air being bubbled upwardly in the annulus during continuous cleansing. A pumping created in part by the aeration conveys the lowermost and dirtiest portion of the moving bed to the annulus scour zone where it is lifted thereinto and cleansed. In the scour zone the media is scoured and expanded to clean the moving bed and individual floc carrier particles. As the floc carrier particles rise, individual particles enter a return zone and are directed back to the moving bed, while concentrated detached floc particles enter the reject area for disposal.

20 Claims, 5 Drawing Figures

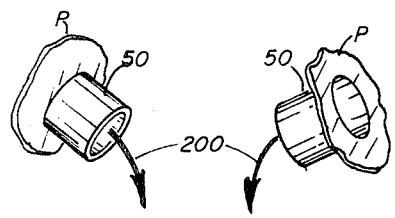
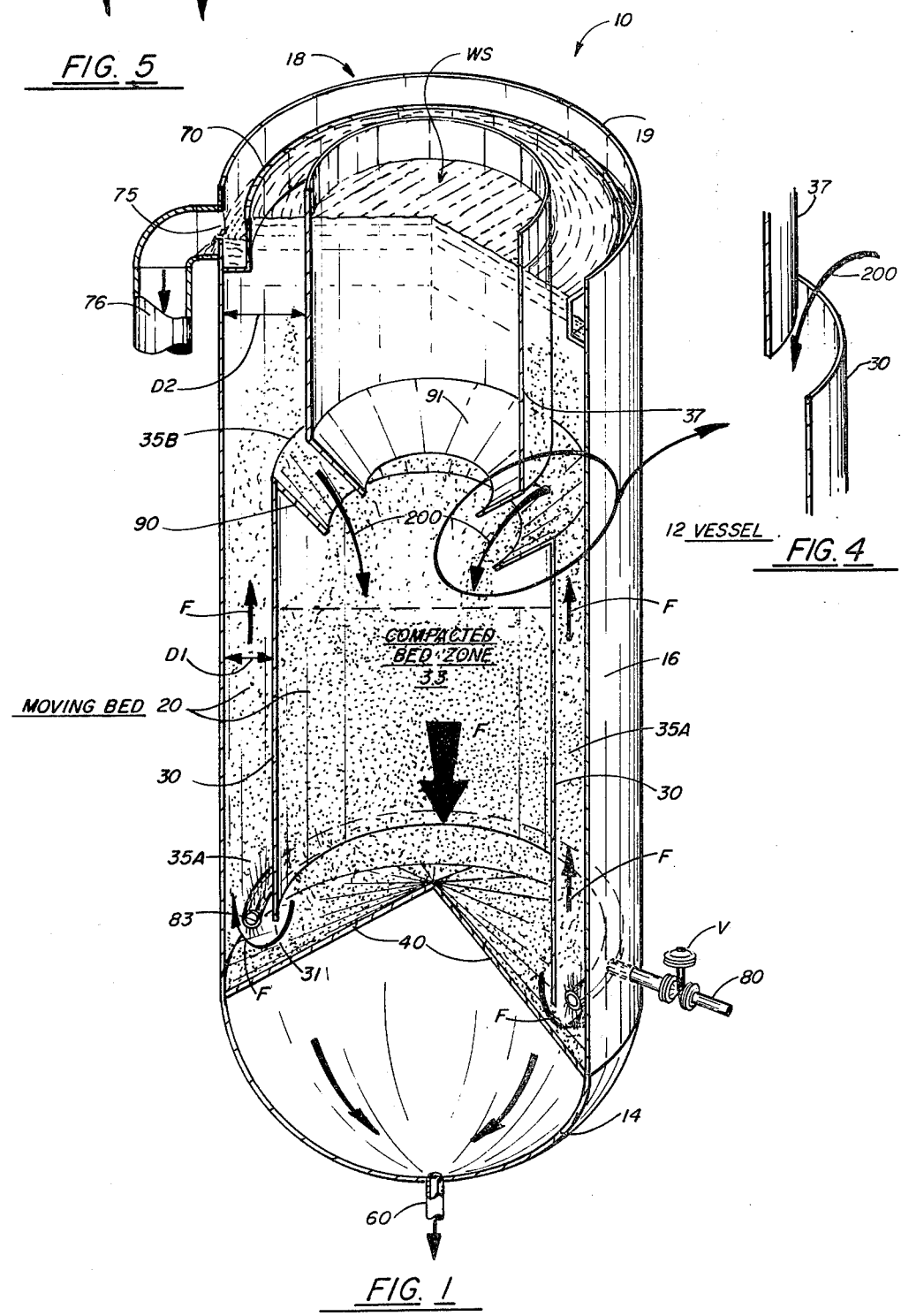

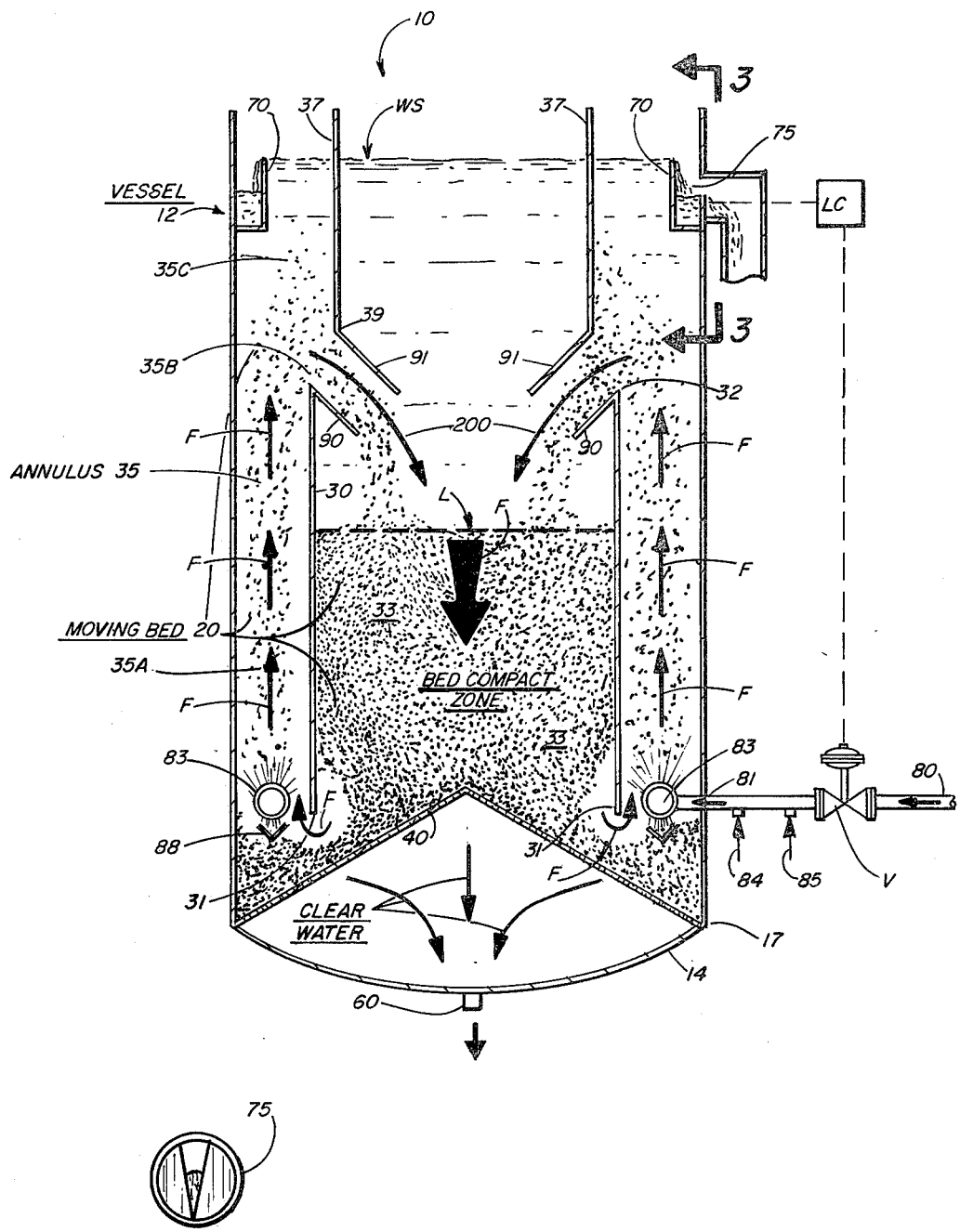
FIG. 3                    FIG. 2

DYNAMIC CLARIFIER SYSTEM

BACKGROUND OF THE INVENTION

1. Field of the Invention

The present invention relates to the clarification of liquids to remove suspended solids. Even more particularly, the present invention relates to the clarification of liquids to remove suspended solids using media and having continuous downward clarification as well as continuous media cleansing, wherein the influent stream is contacted by activated floc attached to floc carrier particles as influent and bed mix during cleansing of the bed.

2. General Background

Various devices are known which attempt to clarify a waste stream or turbid water stream prior to its consumption or use in a power plant, manufacturing facility, or other such industry or for municipal use in a potable water system.

Clarifiers are one such type of device used in an attempt to clarify turbid or waste water. These devices in a crude fashion date back to the time of the early Egyptians. In a clarifier a coagulation blanket is held in position by upward flow into the clarifier. This reduces the suspended solids content of the incoming stream. Problems arise in the use of clarifiers when the sludge blanket is lost. When the sludge blanket is lost there is little or no reduction in turbidity. This is compounded by the fact that particle mass increases since such turbid water is usually preflocculated by adding a polymer. The sludge blanket can be lost, for example, due to rapid flow changes, lost of PH control, convection, mechanical failure due to internal moving parts, and the introduction of very cold clean water into the clarifier with the inlet stream.

Once the sludge blanket is lost and with low water temperature and low suspended solids, there can be a very long recovery rate, up to days. Traditional clarifiers require a large area in which to operate and they tend to add dissolved solids to the water and alter the natural PH of the water. The sludge produced from such clarifiers is difficult to de-water.

Another type of conventional water treatment is the use of sand filters. Sand filters are a down flow type filter which can be effective in treating water provided the influent is at a very low suspended solids level. Significant disadvantages accompany the use of sand filters. Generally such sand filters are a batch process which must be stopped and cleaned periodically. The pressure needed to flow a stream through the unit increases with time due to the continuous buildup of solids in the sand bed. Clean water is required for proper cleansing which is usually accomplished by back flushing. The use of a sand filter is very susceptible to the formation of mud balls which can incapacitate the sand filter unit. Sand filters generally have poor polyelectrolyte efficiency as many "sites" (i.e., places where solid material could attach) are never used and are discarded during cleansing or flushing. Such a unit often channels due to mixing of the media (when multiple medias are required). High intermittent flush volumes are required and high intermittent air volumes are required in the cleaning procedure. Such high volumes raise energy requirements and operating costs.

Sand filters are generally restricted to a very limited capacity for the treatment of suspended solids such as, for example, an influent maximum of twenty to thirty parts per million.

Upflow type sand filters have the same disadvantages generally as the downflow type sand filter with the exception possibly of the need for clean water in order to effect proper cleansing and the electrolyte efficiency is somewhat greater than sand filters of the downflow type.

A tight compacted media bed is necessary for the effective filtration of turbid fluids. Such a tight compacted media bed is accomplished in many cases by utilizing a downflow direction. Effective media cleaning is accomplished by simultaneous aeration and flushing in an upward direction at such a rate as to fluidize the media uniformly. A desirable feature is to flush with unclarified water at a minimum flush rate.

U.S. Pat. No. 4,126,546 issued to Hjelmner, et al, provides an upflow type continuous filter method.

U.S. Pat. No. 2,057,887 shows a clarifying liquid apparatus.

In U.S. Pat. No. 3,395,099 issued to R. D. Johnson there is seen a method and means for backwashing mineral beds.

In U.S. Pat. No. 3,537,582 a liquid filter container utilizing sand is shown.

In U.S. Pat. No. 3,581,895 there is seen an automatic backwashing filter system for swimming pools.

Movement bed apparatus for the treatment of fluid is the subject of U.S. Pat. No. 3,667,604.

A method and apparatus for ultrasonically clarifying liquid is seen in U.S. Pat. No. 3,707,230.

An automatically backwashed gravity filter is the subject of U.S. Pat. No. 3,841,485.

Many of these devices suffer in that they provide for the backwashing of the filter bed rather than a continuous cleansing and filtration. Other such devices which attempt to provide continuous cleansing and filtration, suffer in that the continuous filtration is either ineffective, or the apparatus is unworkable when flow-flux rate increases.

Some patented devices are upflow type which can lose efficiency during cold water temperature periods when viscosity increases thus enhancing the chance for fluidization of the bed.

Other devices use only a small portion of the flow value through the unit to cleanse the dirtiest portion of the filtrate media or sand or the like.

GENERAL DISCUSSION OF THE PRESENT INVENTION

The present invention provides an apparatus to continually clarify and continually flush the floc carrier particles in the dynamic clarification of turbid fluids.

The present invention provides a dynamic clarifier apparatus which comprises a preferably cylindrical vessel having a bottom portion and an upwardly extending continuous sidewall defining therewithin a liquid retaining space. A clear water discharge outlet is provided and an inlet allows introduction of the turbid stream to be clarified.

A vertically extending separation wall generally concentric with the tank sidewall defines an annulus area and moving bed area. An aerator placed within the annulus provides aeration for bubbling air upwardly in the vessel annulus as during continuous flushing of the moving bed. The annulus area provides a lower scour zone, a middle return zone and an uppermost reject zone. A pumping created in part by the aeration conveys the lowermost and dirtiest portion of the moving bed into the annulus scour zone where it is lifted thereinto and cleaned. In the scour zone, the media floc carrier particles are scoured and expanded to clean the moving bed. As the floc carrier particles rise, individual particles now free of flog enter a return zone where they are directed back to the compacted portion of the moving bed area, while concentrated detached floc enters the reject area for disposal.

With the present invention, PH control is not required. Further, the present invention does not increase the amount of dissolved solids which enter the stream being treated.

The present invention provides a dynamic clarifier which rapidly recovers in the event of a malfunction. This period of rapid recovery would normally be a one volume displacement after corrective actions were taken which could be, for example, on the order of about ten minutes. This rapid recovery could make the difference of keeping a particular unit in operation.

The dynamic clarifier of the present invention is less sensitive to temperature and suspended solids loading. It provides no internal moving parts to wear or malfunction.

The dynamic clarifier of the present invention requires only ten to fifteen percent of the area required by a conventional clarifier. The sludge produced is readily de-waterable.

The dynamic clarifier of the present invention is a continuous process which flushes continually while in service. The pressure requirements of the unit are lower and constant rather than the buildup in pressure seen in conventional type sand filters. Unclarified water can be used for flushing, therefore there is no flush storage requirement. Mud ball formation is not a problem and there is high polyelectrolyte efficiency due to refluxing sludge. A single media is all that is required for operation of the dynamic clarifier of the present invention.

The dynamic clarifier of the present invention provided a low reject volume and a continuous low air volume.

The present invention provides a dynamic clarifier which is able to treat influents with high suspended solids of up to, for example, five hundred parts per million.

It is an object of the present invention to provide an apparatus with the advantages of a high flush rate but a low rejection rate.

It is thus an object of the present invention to provide a clarification apparatus for use with liquids which has a high efficiency flush utilizing a high flush rate with the turbid influent stream as flush water which influent stream flush water is then finally clarified.

Another object of the present invention is to provide a clarification apparatus having intimate contact between the influent water having unflocculated particulate matter and activated sludge to provide a highly efficient pre-clarification flocculation condition.

Another object of the present invention is to provide a clarification apparatus using a non-batch process in which continuous flushing is achieved.

Another object of the present invention is to provide a continuous clarification apparatus in which continuous clarification is achieved.

Another object of the present invention is to provide a clarification apparatus having a simplified control system.

Still another object of the present invention is to provide a clarification apparatus which is easy to operate, easy to construct and easy to maintain.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIG. 1 is a sectional schematic view of the preferred embodiment of the apparatus of the present invention;

FIG. 2 is a partially cut away perspective view of the preferred embodiment of the apparatus of the present invention;

FIG. 3 is a sectional view taken along lines 3—3 of FIG. 2;

FIG. 4 is a partial perspective view of the preferred embodiment of the apparatus of the present invention illustrating a second preferred embodiment thereof; and FIG. 5 is a partial sectional view of the preferred embodiment of the apparatus of the present invention illustrating a second preferred embodiment thereof.

DETAILED DESCRIPTION OF THE PREFERRED EMBODIMENT

FIGS. 1 and 2 best show the preferred embodiment of the apparatus of the present invention designated generally by the numeral 10. Continuous dynamic clarifier 10 provides a vessel 12 which has bottom 14 which can be, for example, convex in shape as is shown in the embodiment of FIGS. 1 and 2. Vessel 12 further provides a sidewall 16 which mates at the bottom edge 17 with bottom 14 in a sealable fashion which allows a liquid to be retained therewithin in a liquid retaining space 18 defined as the area within sidewall 16 and bottom 14.

Sidewall 16 extends upwardly to upper edge 19 which can provide the uppermost surface of clarifier apparatus 10.

Vessel 12 thus provides an inner space 18 which would normally contain a liquid such as water, if turbid water for example, was being clarified. A water surface WS is schematically shown in FIG. 1. Also shown in FIG. 1 is moving bed 20 which could be, for example, an activated carbon, crushed walnut hulls, sand or like. Moving bed 20 continuously moves during operation as indicated by direction of flow arrows F in FIG. 2. Moving bed 20 occupies two general zones: compacted bed zone 33 and an expanding zone in annulus 35. Moving bed 20 would comprise a large number of individual floc carrier particles each of which is granular, and individual and thus being movable within vessel 12. Further, each floc carrier particle is cleansible and has a high surface area, and a surface charge to attract particles which are to be removed from the influent stream.

As will be described more fully hereinafter, clarifier 10 provides continuous clarification and continuous cleaning of the moving bed 20. A portion of moving bed 20 is during operation compacted. That compacted zone of moving bed 20 is designated as 33 and provides the portion of bed 20 through which the influent stream passes for clarification, with individual particles of suspended solids and the like adhering to floc material being carried on the tightly packed floc carrier particles and thus being desirably removed from the stream being treated. Compacted zone 33 of media bed 20 lies generally within the confines of separation wall 30 and above perforated outlet plate 40, having an uppermost surface L. The lowermost portion of the compacted media zone 33 is continuously removed therefrom while media is continuously being redeposited to compacted media bed zone 33. After being removed from the lowermost portion of compacted media zone 33, individual media floc carrier particles are continuously cleansed during expansion of the bed. During cleansing of the bed, the entire influent stream is used as flush water, while simultaneously the still useful floc particles contained on individual floc carrier particles now ready for cleansing pre-treats the incoming waste stream during this continuous cleansing/flushing. Continuous flushing/cleansing takes place in the annulus, which will now be discussed more fully.

A lower separation wall 30 is provided within space 18 which can be preferably concentric with sidewall 12.

Lower separation wall 30 terminates at its lower end portion 31 a distance above bottom 14 and conical perforated outlet plate 40. At its upper edge 32, lower separation wall 30 meets zone 35B and thereabove can be of a reduced diameter with the potentially reduced diameter upper portion being designated by the numeral 37. Upper separation wall 37 can be of a smaller diameter, and at its lower edge 39 also communicates with zone 35B.

The space between separation walls 30, 37 and vessel sidewall 16 defines therebetween annulus 35 which can be of differing diameters respectively, above and below a transition zone which forms a return zone 35B of annulus 35. Dimension line D1 in FIG. 1 illustrates the potentially smaller thickness of annulus 35 below at lower separation wall 30, while dimension lines D2 indicate a potentially enlarged thickness of annulus 35 at upper separation wall 37.

Annulus 35 is thus divided into three areas. These areas are designated by the numerals 35A–35C and designate respectively scour zone 35A, return zone 35B and reject zone 35C. In scour zone 35A, the bed is expanded and cleaned while in return zone 35B the enlarged diameter of annulus 35 causes the individual particles to return to compacted bed zone 33 as is schematically illustrated by the arrows 200 in FIG. 1. In reject zone 35C, concentrated detached floc which has been removed from individual floc carrier particles during the scouring and cleansing thereof is carried upwardly to outlet flume 70.

Outlet 60 for the discharge of clarified water is located on bottom 14 of vessel 12 and under perforated plate 40. Flush outlet water is discharged through at a provided upper flume 70 and therefrom is discharged at V-notched weir 75. Filter media 20 level "L" is generally below return zone 35B within lower separation wall 30 which defines media bed area 20. Compacted bed zone 33 contains normally compacted media which clarifies fluid as flow is downwardly towards plate 40.

An inlet header 80 allows the introduction of a water stream to be clarified into vessel 12 after passing through control valve V which can be attached by suitable instrumentation line 82 to a level controller LC which can vary the influent stream through header 80 responsive to the water surface at flume 70.

Influent water through header 80 can be introduced into vessel 12 at opening 81 and thereafter into distribution pipe 83 which can be of a circular configuration placed at the bottom of annulus 35 and around the periphery of vessel 12 adjacent lower edge 31 of separation wall 30. Inlet opening 81 can connect to circular pipe 83 by means of a tee or like connection, with suitable supports such as being welded, or the like to wall 16.

During operation, a polymer and air can be, for example, introduced respectively through lines 84 and 85 into header 80 prior to their introduction through opening 81 into circular distribution pipe 83. Air supplies at least in part the motive force to transfer moving bed 20 upwardly past the lower edge 31 of separation wall 30 and into annulus 35 formed between vessel wall 16 and separation wall 30. Floc carrier particles entering annulus 35 at scour zone 35A thus become unpacked and fluidized by the upflow in annulus 35 and in the annulus 35 area is air scoured and expanded to clean moving bed 20. As bed 20 rises above above wall 30 upper surface to return zone 35B, annulus 35 cross-section area increases from the dimension of D1 to the dimension of D2 as seen in FIG. 1 and the velocity drops below the capture velocity of the media bed individual particles and the floc carrier particles are then deposited to the surface of the media 20 bed within separation wall 30. (See arrows 200 in FIGS. 1 and 2.)

The velocity in annulus 35 reject zone 35C is still great enough to carry "floc" particles into outlet flume 70. Flush outlet water flow is controlled by level controller LC setting a level through the V-notched weir 75 by controlling inlet valve V. Circular distribution header 83 could be at an elevation horizontally even with the bottom 31 of cylindrical separation wall 30. Circular distribution header 83 can be provided with uniformly spaced perforations to allow inlet water, air and polymer to be injected into annulus 35 in an even distribution pattern. The perforations in distribution header 83 could be downwardly facing to minimize clogging by individual floc carrier particles. A deflector 88 could be placed under distribution header 83 to prevent short circuiting of flow. Perforations in distribution header 83 would be enlarged to allow trash to pass therethrough without clogging. Conical perforated outlet plate 40 would be placed at the bottom 14 of vessel 12, a clearance provided between bottom edge 31 of separation wall 30 and outlet plate 40.

Flush outlet water is discharged through flume 70 and out of V-notched weir 75 to discharge pipe 76. In FIGS. 1–2, a continuous nozzle is formed between inwardly depending plates 90–91 attached respectively to upper and lower sidewalls 30, 37. Plate 90 could be perforated.

Nozzles 50 (partially shown) attach to skirt P which could connect between the upper surface of lower separation wall 30 and the lower surface of upper separation wall 37.

In FIGS. 4 and 5, alternate construction of annulus return zone 35B are seen. In FIG. 5, a pair of nozzles 50 return individual floc carrier particles to media bed compacted zone 33. In FIG. 4, a continuous lip (forming the upper surface 32 of lower separation wall 30) is separate from the lower lip of separation wall 37.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A dynamic clarifier apparatus comprising:

a. a vessel having a bottom portion and an upwardly extending continuous sidewall defining therewithin a liquid retaining space;
b. inlet means for adding a water stream to be clarified to said vessel;
c. discharge outlet means for discharging clarified water from said vessel;
d. a moving clarifier bed placed within said vessel, said bed providing in part a compacted zone through which the stream being clarified passes during operation in a downflow direction, enhancing compaction of the bed in said compacted zone;
e. a vessel annulus being provided within said vessel;
f. circulation means within said vessel for circulating the most dirtified portion of said bed from said compacted zone into said annulus, said circulation means comprising at least in part an aerator located in the lowermost portion of said annulus, and;
g. means within said vessel for returning portions of said moving bed within said annulus to the upper surface of said compacted bed zone after cleansing.

2. The dynamic clarifier apparatus of claim 1 wherein said vessel annulus provides a lower vessel annulus scour zone, a middle vessel annulus return zone, and an uppermost vessel annulus reject zone with portions of said moving bed being scoured in said scour zone responsive to upward flow in said vessel annulus, and portions of said moving bed after such scouring are returned in said return zone to the uppermost portion of said moving bed while in said reject zone dirtified particles are channeled to said discharge outlet means.

3. The dynamic clarifier apparatus of claim 1 wherein said return means comprises at least in part an enlargement of said annulus and an opening in said annulus communicating with a portion of said vessel liquid retaining space above said compacted bed zone.

4. The dynamic clarifier apparatus of claim 1 wherein said inlet means is located at the lowermost portion of said annulus, with said incoming water stream being intermixed with a portion of said moving bed in said annulus.

5. A dynamic clarifier apparatus comprising:
a. a vessel having a bottom portion and an upwardly extending continuous sidewall defining therewithin a liquid retaining space;
b. inlet means for adding a water stream to be clarified to said vessel;
c. discharge outlet means for discharging clarified water from said vessel;
d. weir means at the upper portion of said vessel sidewall for discharging excess fluid from said vessel responsive to a liquid level elevation therein to a level above said weir means;
e. a vertically extending separation wall, said separation wall terminating at its lower edge a distance above said bottom and at its upper edge a distance above said weir means, said vessel wall and said separation wall defining a bed area and a continuous flush annulus area which communicate in part at their respective lowermost portions;
f. a moving bed placed within said vessel, said moving bed being compacted at least during operation within a media bed area;
g. aeration means in said vessel creating an upflow in said vessel annulus, a portion of said media entering said annulus responsive to such upflow;
h. return zone means in said separation wall between the upper and lower edge portions thereof, and above the media upper surface level for returning media from said annulus to said media bed area.

6. The apparatus of claim 5, wherein said annulus is external to said media bed area.

7. The apparatus of claim 5, wherein said aeration means comprises at least in part a distribution header placed at the lower portion of said annulus.

8. The apparatus of claim 5, wherein said bottom portion is convex and said discharge outlet means is an opening formed in said convex bottom.

9. The apparatus of claim 5, wherein said inlet means is comprised at least in part of a header attached to said vessel sidewall and there is provided an opening in said sidewall at said header allowing a fluid stream being conveyed from said header to said vessel to pass through said opening into said vessel.

10. The apparatus of claim 5, wherein said weir means is at least in part a V-notched weir provided at the upper portion of said vessel.

11. The apparatus of claim 5, wherein said vessel sidewall is cylindrical and said inner separation wall is likewise cylindrical and substantially concentric with said sidewall.

12. The apparatus of claim 5, wherein said clarifying media is activated charcoal, sand, or crushed walnut hulls.

13. The apparatus of claim 5, wherein said aeration means comprises at least in part a circular distribution header mounted within said vessel at the lowermost portion of said annulus.

14. The apparatus of claim 13, wherein said distribution header is provided with a plurality of spaced air discharge openings.

15. The apparatus of claim 5 further comprising polymer injection means for adding a polymer stream to said inlet means prior to the entry of a water stream to said vessel.

16. The apparatus of claim 5, wherein said aeration means is mounted within said vessel at an elevation substantially equal to the elevation of the lowermost portion of said separation wall.

17. The apparatus of claim 5 further comprising level controller means for controlling the level of liquid within said vessel during operation thereof.

18. The apparatus of claim 5, wherein said return zone means in said separation wall further comprises a nozzle means.

19. The apparatus of claim 18, wherein said separation wall is a varying cross-sectional area respectively above and below said nozzle means.

20. The apparatus of claim 18, wherein said nozzle means further comprises at least in part a pair of downwardly depending nozzles attached to said separation wall at the uppermost portion thereof and said separation wall is substantially cylindrical and being of two parts, an uppermost part of reduced diameter and a lowermost part of greater diameter with said nozzles being placed in a transitional position between said lowermost and said uppermost portions of said separation wall.

* * * * *